Dec. 26, 1922. 1,439,706.
G. KNEUPER.
FILTER.
FILED JULY 23, 1919. 2 SHEETS—SHEET 2.
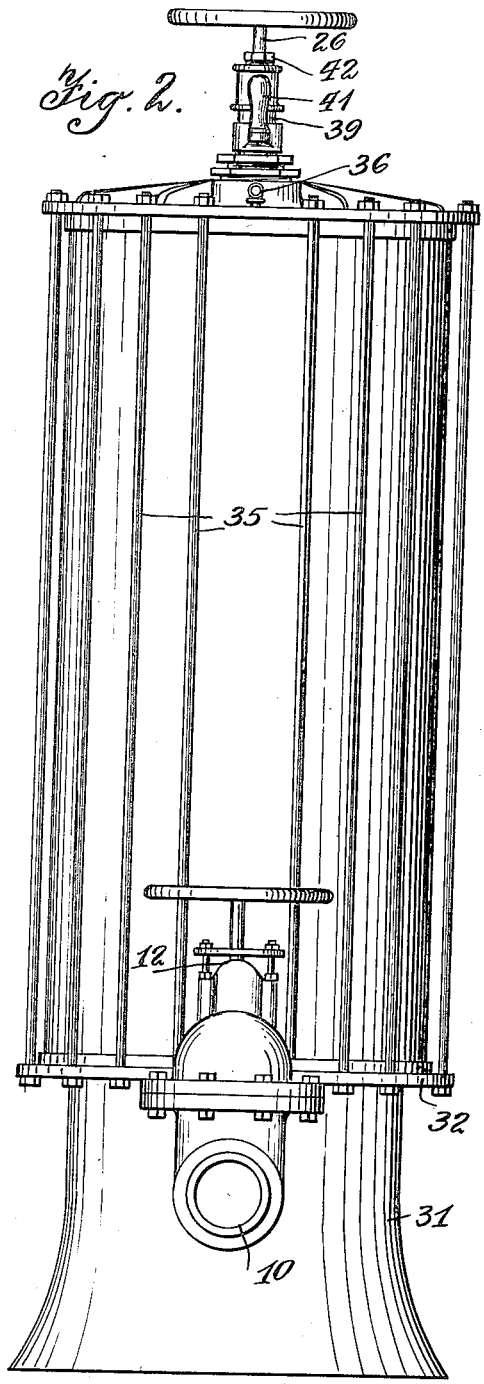
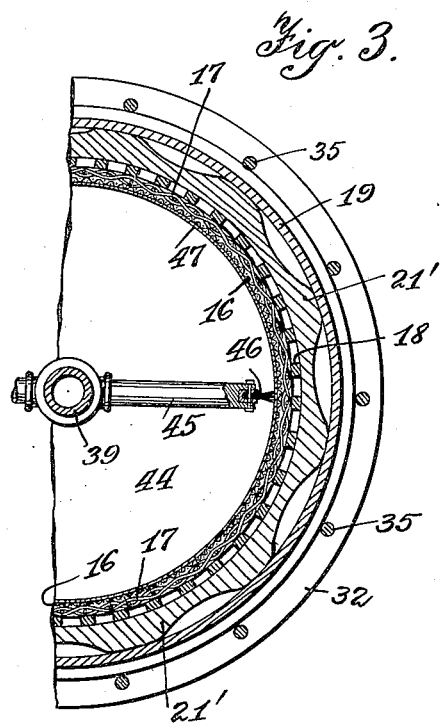
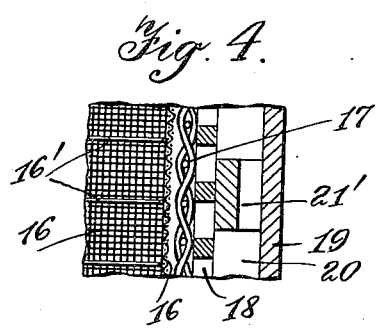
Inventor
George Kneuper
By his Attorney
John Lotka Patented Dec. 26, 1922.

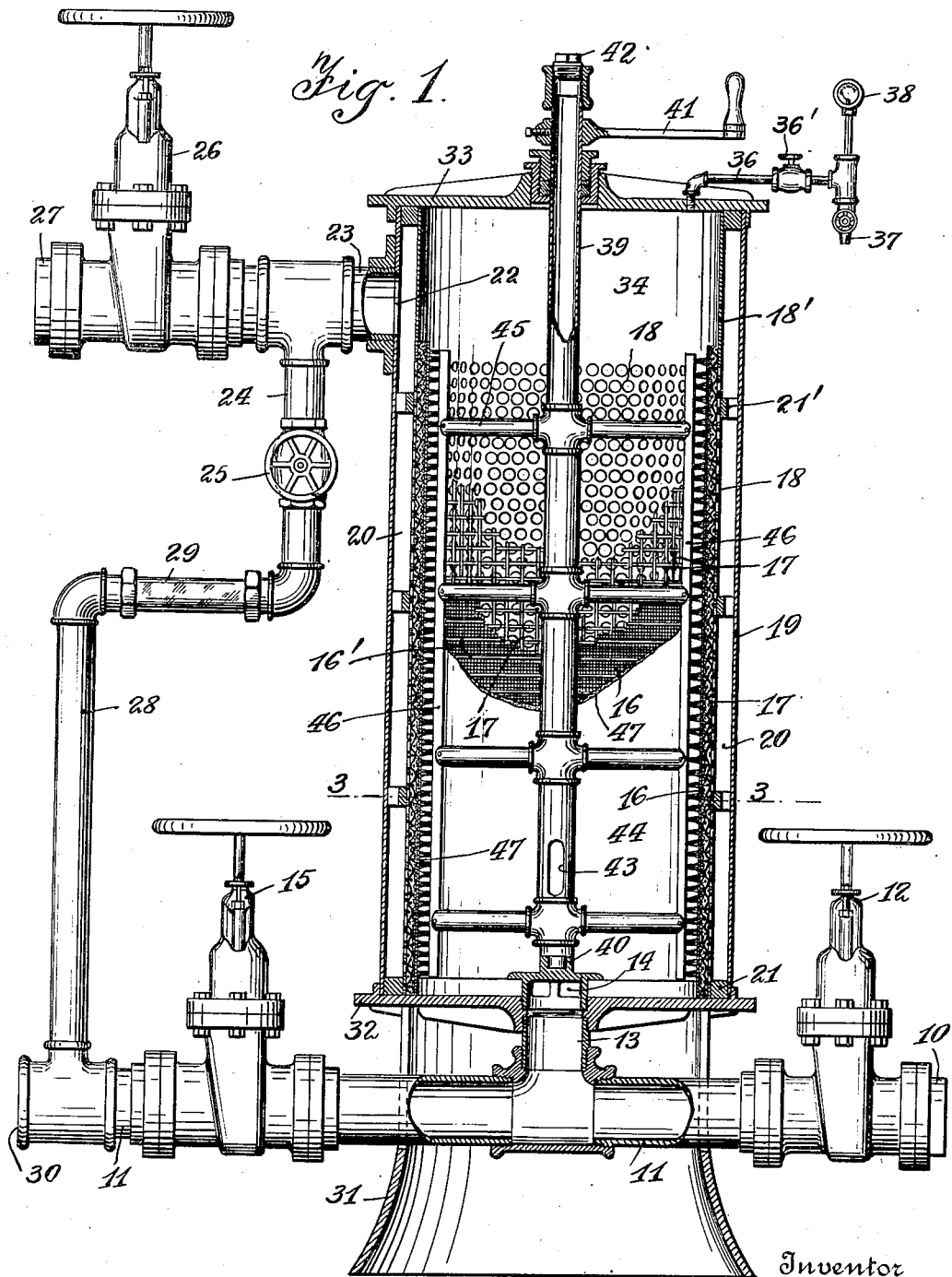

1,439,706

UNITED STATES PATENT OFFICE.

GEORGE KNEUPER, OF BROOKLYN, NEW YORK, ASSIGNOR TO CHARLES HANSEL, OF NEW YORK, N. Y.

FILTER.

Application filed July 23, 1919. Serial No. 312,845.

*To all whom it may concern:*

Be it known that I, GEORGE KNEUPER, a citizen of the United States, and resident of the borough of Brooklyn, county of Kings, city and State of New York, have invented certain new and useful Improvements in Filters, of which the following is a specification.

My invention relates to filters, and has for its object to effect not only a thorough filtration of water or other liquids, but at the same time to separate and recover any oil that may be contained in such liquid, so that the oil thus recovered may be used again for lubricating and other purposes.

A specific example of this invention will now be described in detail with reference to the accompanying drawings, and the novel features of the invention will then be pointed out in the appended claims.

In the said drawings, Fig. 1 is a general view of the improved filter, with parts in section and others in elevation; Fig. 2 is a side elevation of said filter and its accessories; Fig. 3 is a horizontal section taken substantially on line 3—3 of Fig. 1; and Fig. 4 is an enlarged view of a portion of Fig. 1, the filtering film shown in Fig. 1 being, however, omitted from Fig. 4, for the sake of clearness.

It will be understood that while I have shown and described a typical and satisfactory form of my invention, I do not wish to be limited thereto, and various modifications may be made without departing from the nature of my invention as set forth in the appended claims.

At 10 I have indicated the inlet or opening through which the water or other liquid to be treated enters the apparatus, passing into a pipe 11 controlled by a valve 12 of any usual or approved construction, and through a branch 13 and openings 14 into the central chamber of the filter, it being understood that normally the valve 15, located in the pipe 11 beyond the branch 13, is closed so that the liquid will be compelled to pass exclusively through the filter. The filter is shown constructed as an upright cylindrical body with a plurality of co-axial layers, of which the innermost, 16, is a close-mesh metal-wire wall in contact with a surrounding cylindrical metal screen 17 of wider mesh. I prefer to secure spaced horizontal rings, such as 16′, on the inner surface of the layer 16, in order to strengthen this layer, and also for another purpose to be stated hereinafter. The screen 17 again is surrounded by a perforated cylindrical lining 18, also preferably of metal and in contact with said screen 17. It will be observed that the cylinders 16 and 17 extend from the bottom of the apparatus to a distance from the top thereof, terminating at the same level, but the layer or lining 18 is extended to the top of the apparatus, and therefore has a portion 18′ projecting above the upper edges of the layers 16, 17, and this upper portion 18′ is imperforate. All these layers, cylindrical in the particular embodiment shown, are located within an outer casing 19 (also cylindrical in this instance) which is imperforate, with the exception of the outlet connection referred to hereinafter. The lining 18, 18′ is spaced from the casing 19, to form a surrounding or annular chamber 20, this spacing being obtained by means of rings 21, 21′, of which the uppermost and lowermost rings, 21, are solid, thus closing the space or chamber 20 at the top and at the bottom, while the intermediate rings 21′ have openings, so that the liquid may rise past them in said chamber 20. From the upper portion of the chamber 20, an outlet 22 leads to a pipe 23 having a branch connection 24. This branch is controlled by a valve 25, while another valve 26 controls the passage of the liquid through the main portion of the pipe 23 to the main outlet 27 and the place where the filtered liquid is to be used or discharged. The valve 25 controls the passage of the liquid from the branch 24 to a pipe 28 containing a transparent portion or sight-glass 29, and connected with the pipe 11 at a point beyond the valve 15, this end of the pipe 11 having a waste outlet 30. The filter is set on a suitable base or pedestal 31, and is provided with a bottom 32 perforated for the passage of the branch 13, and with a top 33 which in conjunction with the imperforate portion 18′ of the lining 18 forms an imperforate chamber 34 at the top of the filter. The top 33 and bottom 32 are connected by bolts and nuts, as indicated at 35, thereby holding the parts of the apparatus together securely, yet allowing it to be taken apart readily when desired.

Any suitable provision may be made for the convenient removal of the oil which, as explained hereinafter, collects in the chamber 34. For instance, the top 33 may be perforated to connect with an oil-discharge pipe 36 provided with a normally-closed shut-off cock 36' and leading to a nozzle 37, so that upon opening said cock 36', the oil from the chamber 34 will be forced out through the pipe 36 and the nozzle 37 by the pressure of the liquid admitted at 10. At 38 I have indicated a pressure-gauge connected with the pipe 36.

The top 33 of the filter is further shown provided with a central perforation through which extends rotatably a pipe 39, the lower end of which rests in a suitable step-bearing 40, and the upper portion of which, projecting to the outside of the filter casing 19 and top 33, is provided with means, say, a handle 41, for rotating the pipe 39 and the parts connected therewith. The upper end of the pipe 39 is normally closed by a plug 42, and within the lower part of the filter casing said pipe has an opening 43 whereby it communicates with the central chamber 44. Within this chamber, the pipe 39 carries rigidly a number of transverse arms 45, to which are secured longitudinal or upright brushes 46 arranged to travel close to the inner surface of the innermost wall 16, and preferably in very light contact therewith.

In operation, I first prepare, exteriorly of the apparatus, a suitable filtering pulp; when oil is to be separated from the liquid, wool pulp will be a suitable material to use in this filter. A measured charge of the prepared pulp is then poured into the apparatus through the pipe 39, after removing the plug 42, such charge of pulp passing through the opening 43 into the central chamber 44 of the filter and collecting at the bottom thereof. Thereupon the plug 42 is screwed on again, and water (or other liquid) is turned on full by opening the valve 12, this water passing from the pipe 11 through the branch 13 and the openings 14 into the central chamber 44. The pulp lying at the bottom of this chamber mingles with the water which wells up from these openings, and the water, being baffled by the pulp to a certain extent, flows at first in a horizontal direction outwardly, which motion assists in producing a thorough mixture of the pulp with the water. As the mixture rises in the chamber 44, the water passes through the screen wall 16, 17, 18 of the cylinder into the chamber 20, and causes the pulp or rather the filtering material to be deposited in a thin film on the inner surface of the close-mesh wire or screen 16, which is so fine as to retain the filtering material and cause it to form a uniform layer 47 on said screen, covering the entire surface thereof. The thickness of this layer or film depends of course on the amount of the charge introduced into the central chamber 34, and this amount again is determined by the character of the substance to be filtered. The wires or rings 16' form pockets, as it were, on the inner surface of the layer 16, and thus assist in effecting a good connection and support for the film 47 on said layer. After the film has been formed, the water or other liquid to be filtered is compelled to pass through such film, which is so fine or dense that (if the proper filtering material is employed) even the smallest oil globules present in emulsified oil will be unable to pass through the film, in view of the fact that the film is filled or soaked with water. As the oil globules accumulate on the inner surface of the film 47, they gradually merge with adjacent globules into larger ones, and these latter, owing to their being considerably lighter than the water or aqueous liquid, will become detached from the filtering film 47 and will rise to the surface of the liquid. This upper surface will be approximately level with the imperforate upper portion 18' of the lining 18, and therefore is within the imperforate chamber 34, so that the layer of oil floating on top of the liquid will not be in contact with the perforated portion of the lining, and the pressure of the impure liquid arriving in the chamber 44 will not tend to force such oil through the filtering film and through the layers 16, 17, 18, but such oil will be trapped and retained in said chamber 34, being held therein by the imperforate and impervious wall 18'. As the oil accumulates in the chamber or "oil-dome" 34, the moisture or water globules adhering to the oil, being heavier than oil, will gradually drain out. After a certain amount of oil has thus accumulated in the chamber 34, the cock 36' may be opened to allow the oil to pass out throught the pipe 36 and nozzle 37, as hereinabove referred to. As a rule, I prefer to discharge only about four-fifths of the oil collected in the chamber 34, leaving the other one-fifth in said chamber for further draining or separation from moisture. The cock 36' is then closed again, and the filtering operation continued until the desired amount of oil has accumulated again, the intermittent discharge of oil being thus timed according to the accumulation of oil in the chamber 34.

At the beginning of the filtering operation, the liquid leaving the chamber 20 at the outlet 22 may be a little cloudy or turbid, and since in many cases it is not desirable to have anything but a clear filtered liquid, I prefer in such cases to allow the filtered liquid, at the beginning, to flow through the open valve 25 to the branch 24 and pipe 28. thus reaching the waste outlet 30 via the sight-glass 29, so that the condition of the filtered liquid may be observed readily, it being understood that at this time the valve 26 is closed. When the appearance of the liquid flowing through the sight-glass 29 shows that the result of filtration is satisfactory, the valve 25 is closed and the valve 26 opened, so that the purified liquid will pass through the pipe 23 to the main outlet 27.

It will be noted that the discharge valve 26 is located above the level of the filtering area or film 47, so that during the formation of the filtering film 47, the water cannot escape from the central chamber 44 through the film until the latter has been built up to the full height of the perforated layers 16, 17, 18, it being understood that as the water rises gradually, it carries the filtering pulp up with it, and causes it to be deposited instantly on the inner surface of the cylinder or screen 16. This film, notwithstanding its gradual formation or building up, is of uniform thickness and efficiency.

After the filter has been in operation for some time, the impurities deposited on the inner surface of the film 47 will cause the filtration to become slower, and when the rate of filtration becomes lower than permissible or desirable, the brushes 46 are set in motion while keeping up the flow of liquid through the filter. The brushes will dislodge and remove the impurities deposited on the film, and will whirl them around in the water, mixing them therewith, and at the same time, all of the pulp will be loosened and whirled around with the water, and the screen 16 on which said film 47 was deposited will be laid bare in places or throughout its area, so that the water with the impurities can pass out without any filtering action; preferably, this is done in such a manner that the turbid water will be caused to pass out through the sight-glass 29, enabling the appearance of the water to be watched, and when it becomes clear again, this is a sign that all the impurities have been flushed out. While this flushing operation is going on, the brushes 46 are kept in motion, thus preventing the filtering material from being re-deposited on the screen 16 at this time. After the conclusion of the flushing operation, the brushes are stopped, and the film 47 formed again on the screen 16 from the bottom upward, by admitting water or other liquid in the manner set forth hereinbefore, or rather by continuing the flow of water, since the re-depositing of the film will take place immediately when the brushes are stopped if the liquid is kept flowing. These brushes, which are preferably made of metal, should engage the screen 16 but lightly. Ten or twelve revolutions of the brush shaft will generally suffice for the cleaning or flushing operation just described. After three or four cleanings of this character, a new deposit of filtering material may be required, inasmuch as some of the filtering material is flushed out at every cleaning operation. When it is desired to remove the film remnant in order to deposit a new film, the supply valve 12 is closed and the waste valve 15 is opened, allowing the contents of the chamber 44, including such remnant of filtering material, to pass out by gravity through the outlet 30, it being understood that the brushes 46 are rotated at this time to loosen the film 47. Preferably the valve 26 is opened, or the plug 42 removed at this time, to admit air readily during the outflow of the liquid.

When the filter, as described, is to act simultaneously as an oil separator, the filtering material employed should be oil-repellent when soaked with water, so that even the smallest oil globules will be arrested on the inner surface of the film 47 and will merge with other globules to form larger globules which will rise to the surface and form a floating layer in the oil dome 34. As above stated, moisture drains off the oil in the filter, so that the oil removed from the chamber 34 periodically contains very little moisture. Wool pulp has been mentioned hereinabove as an example of an oil-repellent material suitable for use in my filter when the same is to be an oil-separator at the same time.

Other materials may be used according to the particular liquid to be filtered and to the impurities to be recovered from such liquid by flotation.

I claim as my invention:

1. A filter comprising a casing provided with a central inlet at the bottom and a lateral outlet at the top, an apertured body interposed between said inlet and said outlet and comprising a plurality of perforated layers reaching from the bottom of the casing to a point materially below the top thereof, the size of the individual apertures being greatest for the outermost layer and least for the innermost layer, and the outermost layer being spaced from the outer wall of the casing to form a chamber communicating with said outlet, and an imperforate wall extending from the top of the casing downwardly to the level of the perforated layers and forming with the said top a dome or chamber for the reception of material floating on top of the liquid passed through the filter.

2. A filter comprising a casing provided with an inlet and an outlet, a perforated body interposed between said inlet and said outlet and composed of a plurality of apertured layers of which those nearer the inlet have smaller openings than those nearer the outlet, and an imperforate chamber or dome located at the upper portion of the apparatus above said perforated body and communicating with the inlet of the filter to receive and retain material floating on top of the liquid admitted through said inlet.

3. A filter comprising a casing provided with an inlet and an outlet, a body separating said inlet from said outlet and provided in its lower portion with perforations for the passage of liquid from the inlet to the outlet, while the upper portion of said body is imperforate to form a wall of a chamber in which material floating on top of the liquid will collect on the inlet side of the filter and from which such material cannot reach said outlet.

4. A filter comprising a casing provided with an inlet and an outlet, and a body interposed between said inlet and said outlet and spaced from the outer wall of the casing to form an outlet chamber, said body being perforated at its lower portion to allow liquid to pass from the inlet to the outlet, while the upper portion of said body is imperforate to form a wall of a chamber in which material floating on top of said liquid may collect on the inlet side of the filter and from which such material cannot reach said outlet.

5. A filter comprising an apertured body having a plurality of perforated layers, the size of the individual apertures being greatest for the outermost layer and least for the innermost layer, a casing surrounding the outermost layer at a distance to form an outer chamber around said apertured body, said casing reaching from a point level with the bottom of said apertured body to a level materially above the top of said body, an outlet from said outer chamber, an inlet to the chamber within said apertured body, and an imperforate wall extending from the top of the casing downwardly to the level of the perforated layers and forming with said top a dome or chamber for the reception of material floating on top of the liquid admitted to the chamber within said apertured body.

6. A filter comprising a casing provided with an inlet and an outlet, two discharge connections connected with said outlet, a sight-glass in one of said discharge connections, a supply pipe leading to said inlet and having an extension beyond said inlet, and a valved connection from said extension to the discharge connection containing the sight-glass, on the outlet side of said glass, and means whereby the liquid leaving the filter at said outlet may be directed to one or the other of said discharge connections.

7. A filter comprising a casing provided with an inlet and an outlet, two discharge connections connected with said outlet, a sight-glass in one of said discharge connections, a supply pipe leading to and past said inlet, a connection from a point of the supply pipe beyond said inlet to a point of the discharge connection containing the sight-glass, on the outlet side of said glass, a valve controlling the connection of the supply pipe with said discharge connection, and means whereby the liquid leaving the filter at said outlet may be directed to one or the other of said discharge connections.

8. The process of filtering liquids containing oil, which consists in introducing such liquid on one side of an oil-repellent filtering material, collecting the oil on the inlet side of said material, passing the liquid through said material, and discharging the filtered liquid on the other side of said material.

9. The process of filtering liquids containing substances adapted to float on top of such liquids, which consists in introducing such liquid on one side and adjacent to the lower portion of an upright filtering body which repels such floating substance, collecting such floating substance adjacent to the upper portion of said body on the same side of said body on which the liquid is introduced, passing the liquid through said filtering body, and discharging the filtered liquid on the other side of the said filtering body.

GEORGE KNEUPER.